Patented Mar. 4, 1952

2,587,908

UNITED STATES PATENT OFFICE 2,587,908

VAT DYES OF THE ANTHRAQUINONE-AZOLE SERIES

Herman E. Schroeder, Kennett Square, Pa., and Joseph Deinet, Glassboro, N. J., assignors to E. I. du Pont de Nemours & Company, Wilmington, Del., a corporation of Delaware No Drawing. Application March 24, 1950, Serial No. 151,806

6 Claims. (Cl. 260—157)

This invention relates to the preparation of new and valuable vat dyes of the anthraquinone oxazole and thiazole series, and more particularly to new unsymmetrical azobiphenyl carbonylaminoanthraquinone compounds which contain in the molecule an anthraquinone-1,2(N)-oxazole or thiazole group. The compounds of this invention have the general formula:

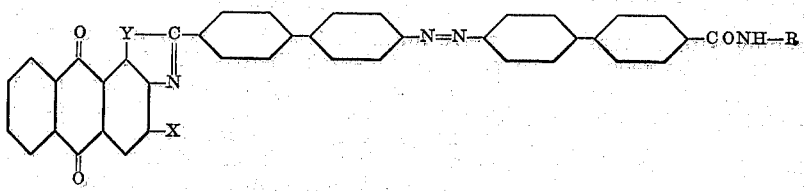

in which Y stands for one of the elements —S— and —O—, X stands for a member of the group consisting of hydrogen, bromine and chlorine, and R stands for a vattable anthraquinonyl radical of the group consisting of an unsubstituted anthraquinonyl radical and the anthraquinonyl radicals carrying simple monovalent substituents of the group consisting of —Cl, —Br, methyl, methoxy, methylthiol, and simple acylamino groups such as the benzoylamino and thenoylamino groups, said anthraquinonyl radicals being attached to the —CONH group in the beta position.

This application is a continuation-in-part of our co-pending application Serial No. 99,873, filed June 17, 1949, now Patent No. 2,559,669, issued July 10, 1951.

The beta-anthraquinonylamide compounds of this invention, as above formulated, are characterized by their exceptional stability when applied to the fiber by hot dyeing methods (e. g. 180° F.). The corresponding alpha-amides, more particularly described in our application Serial No. 99,873, when dyed at 180° F., lose some strength and develop some dullness and reddish shade. Although the products of Serial No. 99,873 are excellent yellow vat dyes when applied by the cold dyeing method, the instant colors may be applied by either the cold or hot dyeing method. In general the new products, as compared with the alpha analogs, are somewhat greener and brighter in shade.

It is an object of the present invention to produce new and valuable dyes of the anthraquinone vat dye class which will dye cellulose and related fibers from the usual alkali hydosulfite vats in desirable yellow shades and which exhibit good brightness, tinctorial strength and fastness properties. It is a more specific object of the invention to produce anthraquinone vat dyes which can be dyed either by cold or hot dyeing methods, and which carry an anthraquinone aminocarbonyl group linked through the beta position.

These colors are best prepared in a non-reactive medium by condensing a 4,4'-azobiphenyl-4'',4'''-dicarbonyl chloride with 2-amino-1-halogen anthraquinone to produce the oxazole or with a 1-mercapto-2-aminoanthraquinone to produce the thiazole at temperatures in the range of from 120° to 150° C., and then further condensing the resulting compound without isolation with a beta-aminoanthraquinone compound at temperatures in the range of from 160° to 220° C. The diamido compound so obtained is ring-closed to the oxazole or thiazole in the same solution, with or without the addition of an acid binder and catalysts, at elevated temperature usually in the range of from 160° to 220° C. If desired, an azobiphenylcarbonyl - (beta) - aminoanthraquinone-carbonyl chloride may be condensed with a 2-amino-halogen-anthraquinone or 2-aminoanthraquinone-1-mercapto Na salt and then ring closed to the corresponding oxazole or thiazole in the same manner, or by condensing 4'' - (1,2(N) - anthraquinoneoxazolyl) - azobiphenyl-4'''-carbonyl chloride with a beta-aminoanthraquinone compound.

The products may be conditioned for dyeing in the usual manner, such as by milling or acid pasting with or without purification by bleaching with sodium hypochlorite customarily employed in purifying vat dyestuffs of the anthraquinone series. These new vat dyes are bright yellow pastes. They dye cotton and related fibers in strong, bright yellow shades from redbrown alkaline hydrosulfite vats, and the dyeings show very good light-fastness and tinctorial strength. The dyes may be applied by cold or hot dyeing methods. They dye rapidly and exhaust well.

The following examples are given to illustrate the invention. The parts used are by weight.

Example 1

Nine hundred (900) parts of nitrobenzene, 2 parts of pyridine, 50 parts of 4,4'-azobiphenyl-4'',4'''-dicarboxylic acid and 43 parts of thionyl chloride are agitated and heated at 95° to 100° C. for 18 to 20 hours. The mass is then air blown for one-half hour to remove excess of thionyl chloride. 30.5 parts of 1-chlor-2-aminoanthraquinone are added, the reaction mass is heated to 138°–140° C., and agitated at this temperature for 6 hours. After cooling to 100° C., 26.5 parts of 2-aminoanthraquinone are added, then the mass is heated to 210° C. and maintained at this temperature for one hour. After cooling to 100° C., 50 parts of sodium carbonate, 50 parts of potassium acetate, 1 part of cupric acetate and 1 part of cuprous chloride are added, the mass is then heated to 210° C. and maintained at this temperature for 3 hours. The reaction mass is then cooled to 50° C., filtered, the filter cake is washed with nitrobenzene, alcohol and hot water in turn and dried.

After acid pasting and bleaching with sodium hypochlorite, the product forms a bright yellow paste and dyes cotton from a sodium hydrosulfite vat in bright yellow shades of very good fastness properties.

The product of this example has the following structural formula:

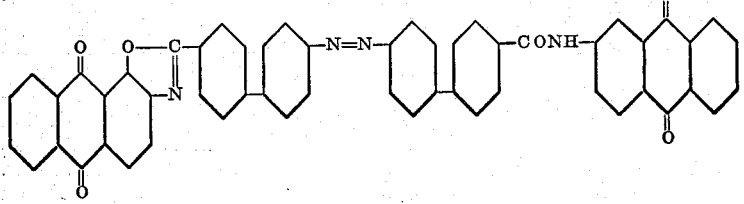

Example 2

Twelve hundred (1200) parts of nitrobenzene, 55 parts of 4,4'-azobiphenyl-4'',4'''-dicarboxylic acid chloride and 30.5 parts of 1-chloro-2-aminoanthraquinone are heated together to 138°–140° C. and maintained for 6 hours. The reaction mass is then cooled to 50° C. and 28.5 parts of 2-amino-3-methylanthraquinone are added, and the reaction mass is heated to 210° C. and agitated at this temperature for 2 hours. The reaction mass is then cooled to 100° C., 50 parts of sodium carbonate, 50 parts of potassium acetate, 1 part of cupric acetate and 1 part of cuprous chloride are added, thereafter heated to 210° C., and reacted at this temperature for 3 hours. The reaction mass is then cooled to 70° C., filtered, the filter cake is washed with nitrobenzene, alcohol and hot water in turn, and dried. The product, upon acid pasting and bleaching with sodium hypochlorite, forms a bright yellow paste and dyes cotton from a sodium hydrosulfite vat in bright yellow shades of excellent fastness properties.

Example 3

Six hundred (600) parts of nitrobenzene, 14.1 parts of 2-amino-3-bromoanthraquinone and 30 parts of the following carboxylic acid chloride:

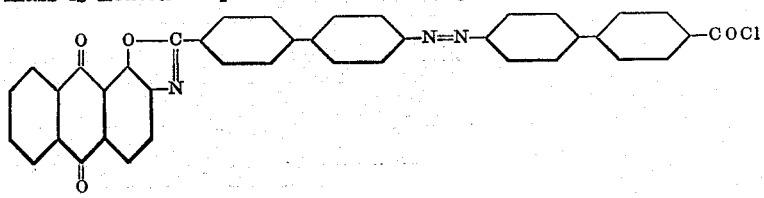

as described in Example 10 of Schroeder & Deinet application Serial No. 99,873, are heated together to 210° C. and maintained at this temperature for 1½ hours. The reaction mass is then cooled to 50° C., filtered, the filter cake is washed with nitrobenzene and alcohol in turn, and dried.

The product is then acid pasted and bleached with sodium hypochlorite. It forms a bright yellow paste and dyes cotton from a sodium hydrosulfite vat in very bright yellow shades of excellent fastness properties.

Example 4

Twelve hundred (1200) parts of nitrobenzene, 55 parts of 4,4'-azobiphenyl-4'',4'''-dicarboxylic acid chloride and 26.5 parts of 2-aminoanthraquinone are heated together to 140° C. and maintained at this temperature for 6 hours. The reaction mass is then cooled to 25° C. and 45 parts of 1,3-dibromo-2-aminoanthraquinone are added. The mass is then heated to 200° C. and maintained at this temperature for 2 hours. The reaction mass is then cooled to 100° C. and, after addition of 50 parts of sodium carbonate, 50 parts of potassium acetate, 1 part of cupric acetate and 1 part of cuprous chloride, is heated to 210° C. and agitated at this temperature for 3 hours. The mass is then cooled to 50° C., filtered, and the filter cake is washed with nitrobenzene, alcohol and hot water in turn, and dried.

The product is then acid pasted and bleached with sodium hypochlorite. It forms a bright yellow paste and dyes cotton from a sodium hydrosulfite vat in bright yellow shades of good fastness properties, and has the formula:

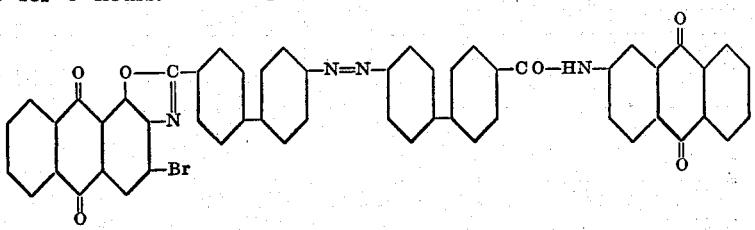

Example 5

Twelve hundred (1200) parts of nitrobenzene, 55 parts of 4,4'-azobiphenyl-4'',4'''-dicarboxylic acid chloride and 39 parts of 1-bromo-2-aminoanthraquinone are heated together to 148° C. and maintained at this temperature for 6 hours. The reaction mass is then cooled to 50° C., and after addition of 26.5 parts of 2-aminoanthraquinone, is heated to 210° C. and agitated at this temperature for 1½ hours. The mass is then cooled to 100° C. and 50 parts of sodium carbonate, 50 parts of potassium acetate, 1 part of cupric acetate and 1 part of cuprous chloride are added, thereafter heated to 210° C. and agitated at this temperature for 3 hours. The reaction mass is then cooled to 50° C., filtered, the filter cake is washed with nitrobenzene, alcohol and hot water in turn, and dried.

The product is then acid pasted and bleached with sodium hypochlorite. It forms a bright yellow paste and is identical with the product of Example 1.

parts of 2-aminoanthraquinone and 46 parts of 4,4'-azobiphenyl-4'',4'''-dicarboxylic acid chloride are heated together to 138°–140° C. and maintained for 6 hours while agitating. The mass is then air blown for ½ hour to remove hydrochloric acid. After cooling to 25° C., 27.7 parts of 1-mercapto-(Na salt)-2-aminoanthraquinone are added and the mass heated to 210° C. and maintained at this temperature for 1½ hours. The reaction mass is then cooled to 50° C., filtered, the filter cake is washed with nitrobenzene, alcohol and hot water in turn, and dried.

After acid pasting and bleaching with sodium hypochlorite, the product forms a bright yellow paste and dyes cotton from a sodium hydrosulfite vat in bright yellow shades of very good fastness properties.

This product has the formula:

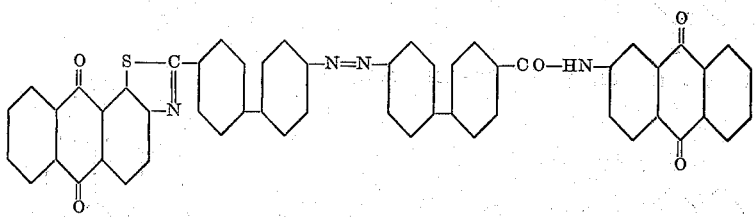

Example 6

Twelve hundred (1200) parts of nitrobenzene, 55 parts of 4,4'-azobiphenyl-4'',4'''-dicarboxylic acid chloride and 30.5 parts of 1-chloro-2-aminoanthraquinone are heated together to 140° C. and maintained at this temperature for 6 hours. The reaction mass is then cooled to 50° C. and 32 parts of 1-methylthio-2-aminoanthraquinone are added, thereafter heated to 205° C., and reacted at this temperature for 1½ hours. The mass is then cooled to 100° C., 50 parts of sodium carbonate, 50 parts of potassium acetate, 1 part of cupric acetate and 1 part of cuprous chloride are added, the whole is then heated to 210° C. and maintained at this temperature for 3 hours. The reaction mass is then cooled to 60° C., filtered, the filter cake is washed with nitrobenzene, alcohol and hot water in turn, and dried.

The product is then acid pasted and bleached with sodium hypochlorite. It forms a bright yellow paste and dyes cotton from a sodium hydrosulfite vat in very bright yellow shades of excellent fastness properties. It has the formula:

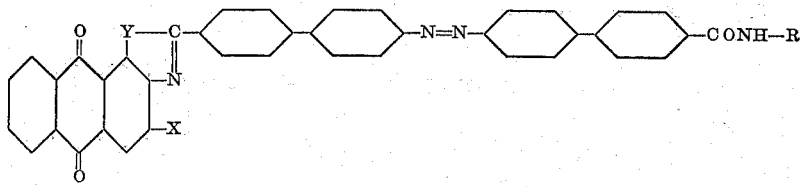

Example 7

Ten hundred (1000) parts of nitrobenzene, 22.3

In place of the amino halogen compounds described in the examples, we may use 2-amino-1-bromo-3-chloroanthraquinone to produce the oxazole portion of the molecule.

In the formation of the amide portion of the molecule, excellent dyestuffs are obtainable by using one molecular equivalent of 2-amino-1-mercaptoanthraquinone, 2-amino-1-benzoylaminoanthraquinone, 2-amino-1-chloroanthraquinone, or 2-amino-1,3-dichloroanthraquinone, or similar beta-aminoanthraquinone compound.

We claim:

1. The compounds of the formula:

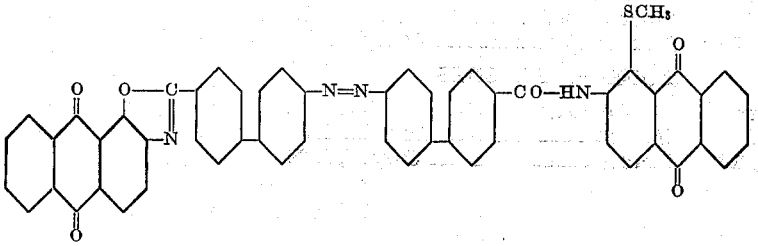

in which Y stands for an element of the group consisting of —S— and —O—, X stands for a member of the group consisting of hydrogen, bromine and chlorine, and R stands for a vattable anthraquinonyl radical of the group consisting of an unsubstituted anthraquinonyl radical and the anthraquinonyl radicals carrying monovalent substituents of the group consisting of —Cl, —Br, methyl, methoxy, methyl-thiol, and benzoylamino radicals ortho to the —CONH— group, said anthraquinonyl radicals being attached to the —CONH group in the beta position.

2. The compound of the formula:

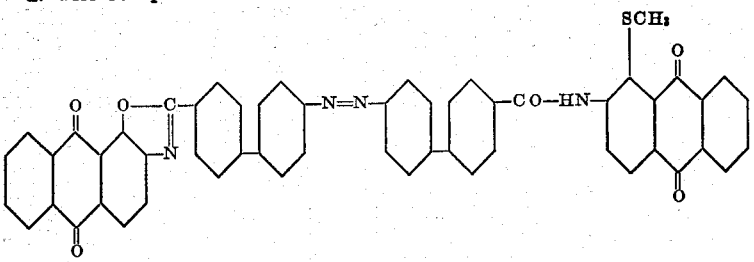

3. The compound of the formula:

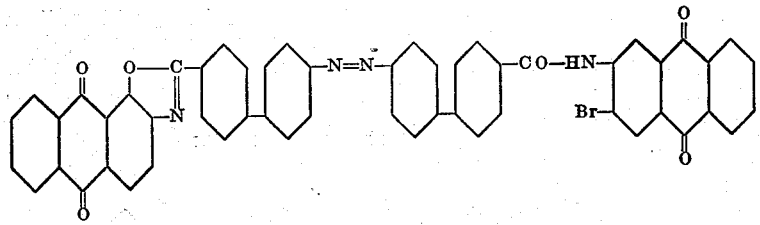

4. The compound of the formula:

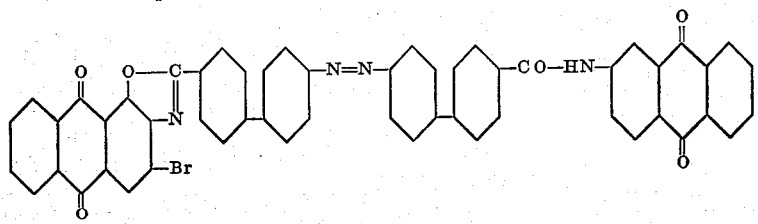

5. The compound of the formula:

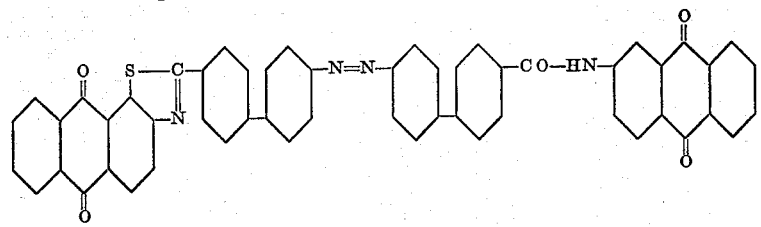

6. The compound of the formula:

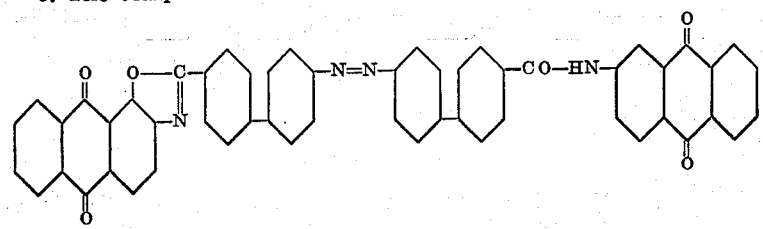

HERMAN E. SCHROEDER.
JOSEPH DEINET.

REFERENCES CITED

The following references are of record in the file of this patent:

UNITED STATES PATENTS

| Number | Name | Date |
|---|---|---|
| 2,175,803 | Honold et al. | Oct. 10, 1939 |
| 2,228,455 | Honold et al. | Jan. 14, 1941 |

FOREIGN PATENTS

| Number | Country | Date |
|---|---|---|
| 826,768 | France | Aug. 12, 1939 |
| 848,018 | France | July 17, 1939 |